US011524807B2

(12) United States Patent
Winstanley et al.

(10) Patent No.: US 11,524,807 B2
(45) Date of Patent: Dec. 13, 2022

(54) FOOD PROCESSING IN METAL CANS (75) Inventors: Lucy Michelle Winstanley, Gloucestershire (GB); Paul Charles Claydon, Oxon (GB); Christopher Paul Ramsey, Oxon (GB)

(73) Assignee: Crown Packaging Technology, Inc., Aslip, IL (US)

( * ) Notice: Subject to any disclaimer, the term of this patent is extended or adjusted under 35 U.S.C. 154(b) by 1080 days.

(21) Appl. No.: 14/240,908

(22) PCT Filed: Aug. 24, 2012

(86) PCT No.: PCT/GB2012/052091
§ 371 (c)(1),
(2), (4) Date: May 28, 2014

(87) PCT Pub. No.: WO2013/027067
PCT Pub. Date: Feb. 28, 2013

(65) Prior Publication Data
US 2014/0335248 A1 Nov. 13, 2014

(30) Foreign Application Priority Data
Aug. 25, 2011 (GB) ..................... 1114686

(51) Int. Cl.
B65B 55/14 (2006.01)
A23L 3/3418 (2006.01)
A23L 3/04 (2006.01)
B65B 25/00 (2006.01)

(52) U.S. Cl.
CPC ................ B65B 55/14 (2013.01); A23L 3/04 (2013.01); A23L 3/3418 (2013.01); B65B 25/001 (2013.01)

(58) Field of Classification Search
USPC ....... 426/397, 401, 402, 405, 406, 407, 234, 426/131; 99/495
See application file for complete search history.

(56) References Cited

U.S. PATENT DOCUMENTS 1,980,417 A * 11/1934 Malmquist .............. B65B 31/04
141/61
2,076,459 A * 4/1937 Hanson ..................... A23L 2/44
426/313
(Continued)

FOREIGN PATENT DOCUMENTS

EP 0895719 A1 2/1999
JP S57174076 A * 10/1982
JP H0342069 * 6/1991 ............... A23L 3/00

OTHER PUBLICATIONS

Machine Translation Sawamura et al. JP H0342069 (Year: 1991).*

Primary Examiner — Erik Kashnikow
Assistant Examiner — Lela S. Williams
(74) Attorney, Agent, or Firm — Condo Roccia Koptiw LLP (57) ABSTRACT A method of canning and processing a particulate edible product, the method comprising: providing a metal can body with one open end; filling the metal can body through said open end with the particulate edible product and a volume of liquid, the volume of liquid comprising no more than 30% of the internal volume of the metal can; fixing a lid to the metal can body to close the open end; and using an induction heating process to heat the liquid in the can and thereby process the product.

27 Claims, 8 Drawing Sheets (56) References Cited

U.S. PATENT DOCUMENTS

| | | | | |
|---|---|---|---|---|
| 2,286,999 | A | * | 6/1942 | Smith, Jr. .............. A23L 3/0155 426/404 |
| 3,704,140 | A | * | 11/1972 | Petit et al. ................ A23L 3/10 426/131 |
| 3,873,747 | A | * | 3/1975 | Evert ................... A23B 4/0056 426/325 |
| 4,156,741 | A | * | 5/1979 | Beauvais .................. A23L 3/10 426/131 |
| 5,114,725 | A | | 5/1992 | Leake et al. |
| 5,706,721 | A | * | 1/1998 | Homes .................. A47J 43/286 100/110 |
| 5,804,237 | A | * | 9/1998 | Diamond .................. A23L 3/02 220/609 |
| 6,177,662 | B1 | | 1/2001 | Rutledge |
| 2007/0180175 | A1 | | 8/2007 | Hedin |
| 2011/0083810 | A1 | | 4/2011 | Lin et al. |

\* cited by examiner

Collapsed bead and platform   Platform with legs
H   I

FOOD PROCESSING IN METAL CANS

CROSS-REFERENCE TO RELATED APPLICATIONS

This application is the National Stage of International Application No. PCT/GB2012/052091 filed Aug. 24, 2012, which claims the benefit of GB application number 1114686.7, filed Aug. 25, 2011, the disclosures of which are incorporated herein by reference in their entirety.

TECHNICAL FIELD

The present invention relates to processing particulate edible products contained in closed metal cans.

BACKGROUND

Canning is the process of preserving an edible product by processing and sealing it in an airtight metal can. Cans suitable for storing edible products are typically either two-piece or three-piece cans. In the case of a two-piece can, a can body is formed by punching a metal plate to form a cylinder closed at one end. The can is then filled and the open end closed by seaming a lid to the can body during the canning process. In the case of a three-piece can, a can body, open at both ends, is formed by rolling and seaming a metal plate. A first end is closed by seaming a lid to the can body. The can is then filled and the second end closed by seaming a lid to the can body during the canning process.

A particulate product is a product that, as part of the final product, would not typically contain any liquid other than the liquid contained within the particles themselves. For example, particulate products may be peas, vegetables and beans, but would not typically be soup, spaghetti in tomato sauce or beans in tomato sauce. The particulate edible product is combined with a liquid in the can. The liquid can be water, or any other suitable liquid in which the edible product can be stored, for example brine or fruit juice. The volume of liquid added to the can with the edible product will typically be enough to substantially cover the mass of the edible product such that it is submerged. The level of the liquid and edible product together takes up substantially the entire internal volume of the can, except for a small volume known as the "headspace".

Once a metal can has been filled and sealed, it is typically heated in order to process and/or sterilise the edible product and interior of the can. Processing generally takes place within a cooker referred to as a "retort". The retort pressure is set in an attempt to balance the internal and external pressures to which the can is subjected, i.e. to minimise the pressure differential and the stresses to which the can is subjected. Heating cans using a conventional retort can be relatively slow, as the heat transfer occurs by conduction through the can wall. It is also inefficient as the retort needs to be heated as well as the can. Likewise, the cooling of the can after heating may also be slow if the retort has to be cooled down too.

Alternative methods of processing canned products have been considered. For example in U.S. Pat. No. 6,177,662, a method and apparatus using induction heating is disclosed in an attempt to reduce the total time during which the contents of the can are heated. The cans are induction heated at super-atmospheric pressure in order that the cans are able to withhold the increase in internal pressure.

US 2007/0170175 describes a vending machine that can vend hot beverages by heating the canned beverage by induction heating prior to vending. Heating and cooking are very different, and many more aspects (for example increases in internal pressure, cooking quality etc) must be taken into consideration when cooking within a closed metal can than when merely heating up a product.

The present solutions for heating and processing food products in closed metal cans are inadequate for a number of reasons, including inefficiency of heat transfer to the product, wasted energy cost of heating things other than the edible product, technical difficulties with overcoming internal pressure within the can during heating, high water consumption, the need to heat retort up to temperature, and also slow cooling times.

SUMMARY

It is an object of the present invention to provide improved processing of particulate edible products within closed metal cans. This can be achieved by using beverage-style metal cans that are better at resisting increases in internal pressure, and using induction heating to heat a relatively small amount of water provided within the can to process the particulate edible product.

According to a first aspect of the invention there is provided a method of canning and processing a particulate edible product, the method comprising: providing a metal can body with one open end; filling the metal can body through said open end with the particulate edible product and a volume of liquid, the volume of liquid comprising no more than 30% of the internal volume of the metal can; fixing a lid to the metal can body to close the open end; and using an induction heating process to heat the liquid in the can and thereby process the product.

The volume of liquid provided in the can may be up to 20% of the overall volume of the can.

The volume of liquid provided in the can may be substantially 15% of the overall volume of the can.

Induction heating may be applied to heat the liquid for no longer than 7 minutes.

The can wall thickness at the thinnest point on the sidewall of the metal can body may be less than 0.1 mm.

Once closed, the metal can may be able to withstand an internal pressure differential of at least 4 kPa.

The method may further comprise agitating the contents of the metal can during at least the heating step by one or more of rolling, vibrating, rotating and turning over the metal can.

Steam may be produced from the liquid once a high temperature of at least 110° C. is reached within the can.

The method may further comprise actively cooling the can and its contents after heating.

The contents of the can may be agitated during active cooling of the can and its contents.

The metal can may be pressurised with an inert gas before being closed with the lid, and the inert gas may be Nitrogen.

The pressure differential between the inside of the can and the atmospheric pressure outside of the can before the heating step may be between 5 and 30 psi (between 34.5 and 207 kPa), and may be substantially 20 psi (138 kPa).

The metal can may be provided with a means for separating the particulate edible product from the liquid inside the can, and the means for separating may be an annular groove formed in the based of the can into which the particulate edible product does not fit, or it may be a separation platform supported part way up the length of the can body at a predetermined distance from the bottom of the can.

The steps of the method may be carried out on a canning and processing conveyor.

Embodiments of the present invention may provide an improved and more efficient method and apparatus for processing particulate edible products within closed metal cans.

The metal can body may comprise steel.

The metal can body may be configured such that, during the induction heating process, the temperature of the can body does not exceed 220 degrees Celsius, or preferably 180 degrees Celsius, regardless of field strength produced by an induction coil.

According to a further aspect of the present invention there is provided a method of processing an edible product contained in a metal can, the method comprising causing the metal can to move along a conveyor, and energising one or more induction coils located beneath the conveyor as the can passes over the coil(s) in order to heat the edible product. The can may roll along the conveyor such that the can rolls around the can axis.

DETAILED DESCRIPTION

As discussed above, the current solutions of heating and processing food products in closed metal cans are inadequate for a number of reasons.

New methods and apparatus will now be described, with reference to the figures, that provide an improved solution for processing edible contents in closed metal cans.

Figure 1:
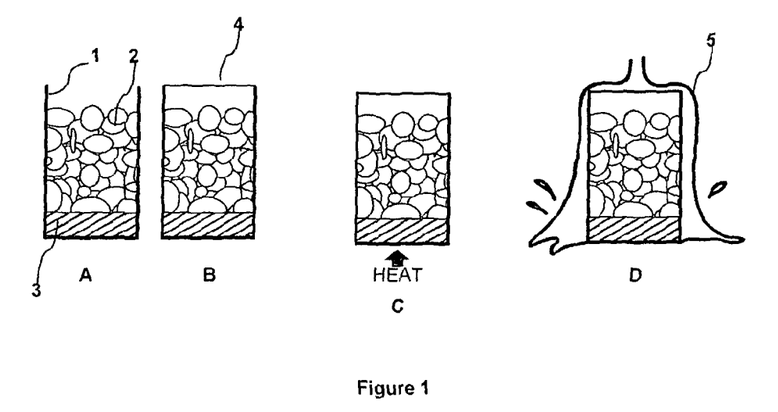
FIG. 1 shows metal cans at four stages during an improved canning process.

FIG. 1 shows metal cans at four stages, A to D, during an improved canning process:

Stage A shows a can body 1 during the filling stage. At this stage, the particulate edible product 2 is transferred into an empty open metal can body with a relatively small volume of water 3. Instead of the usual practice of adding water to submerge the particulate edible product, the amount of water fills only part of the internal volume of the can. For example, the water added may take up to 30% of the internal volume of the can, and preferably less than 20% of the internal volume of the can. Alternatively the volume of water to be added may be calculated by ratio with the particulate edible product. For example, there may be 1 part water for every 5 parts of peas added to the can. This reduction in water volume within the can has multiple benefits. For example, the weight of the filled can is reduced, leading to lower transport costs, and the volume of water required to be heated during processing is reduced, resulting in less energy required to be input during processing and faster heating due to reduced thermal inertia.

It is particularly advantageous if the metal can is a "beverage-style" can. A beverage-style can is made from thinner metal than traditional food cans, and does not typically contain beading in the side walls. Because of this, beverage-style cans are cheaper to produce and are also lighter so incur lower transport costs. Because of their overall design, beverage-style cans are better than traditional steel food cans at withstanding increases in internal pressure of up to 6 bar pressure (87 psi, 600 kPa). In order to maintain a level of side wall strength so as not to be dented or damaged, a beverage-style can is pressurised. In the case of can containing drinks, the internal pressure is usually provided by the carbonation of the drink, but in the case of the present invention, the can is pressured at the time of sealing the lid to the can body. This could be done by flushing with liquid nitrogen before seaming. The beverage-style can may be formed from aluminium, but steel is particularly advantageous due to its lower conductivity, and therefore higher suitability for use with induction heating.

Stage B shows a can after it has been sealed with a lid 4. In the case of a beverage-style can, the can is pressurised slightly prior to sealing. The increase in internal pressure will give the beverage-style can better structural support. An internal pressure differential of 5 psi (34.5 kPa, 0.34 bar) to 25 psi (172.4 kPa, 1.72 bar) will provide sufficient "abuse resistance" (i.e. resistance against the can being damaged) during distribution.

The internal pressure also acts to suppress the boiling point of the water in the can so that little steam vapour is produced until the water temperature is significantly above 100° C. For example, with a Nitrogen fill pressure of 1 bar (100 kPa, 14.5 psi) the water does not start to significantly produce vapour until the can pressure reaches around 5 bar (500 kPa, 72.5 psi) and the temperature of the water reaches about 140° C.

Figure 2:
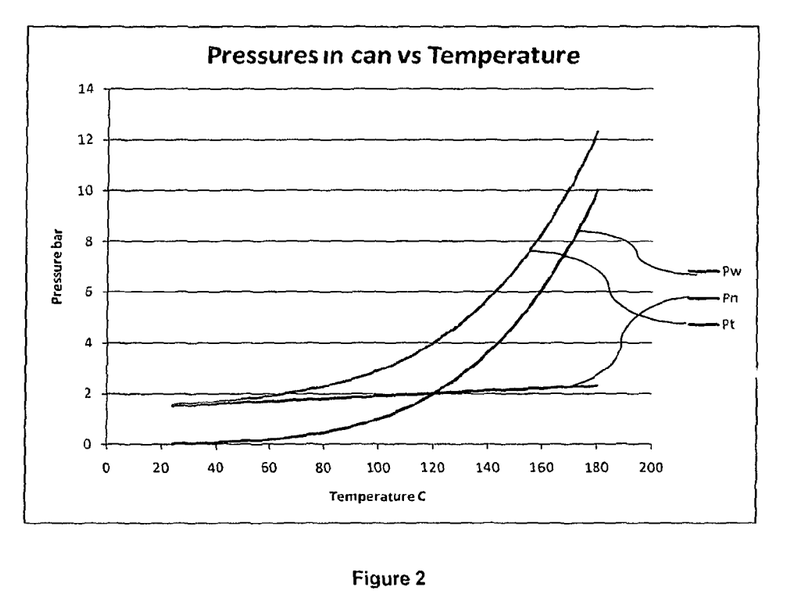
FIG. 2 is a graph showing pressures in a can against temperature.

FIG. 2 shows a graph of internal pressures in a can against temperature. Pt is the total pressure, while Pw and Pn are the water and nitrogen pressures respectively. Stage C shows the can during the heating stage. Research has found that the best way to process canned particulate products is to heat it up very quickly and only let it remain at a high temperature for a short period of time. This is hard to do when the can is full of water as there is a much larger volume to heat up. However, when the volume of water is small, it is quickly heated up and produces high temperature water and steam faster. The pressure in the can increases as it is heated, giving the water a higher boiling point. The particulate edible product is therefore processed at a high temperature and under pressure for a short period of time, giving the optimum conditions for processing canned particulate edible products. Heat can be transferred to the can within a retort. However, it is beneficial to use induction heating as this provides an even faster and more efficient heating method. During the heating stage, the can may be rotated, vibrated or agitated in order to allow the contents to be mixed well, and to ensure even heat transfer.

It has been found that a 330 ml steel beverage-style can containing 50 ml of water can be heated with 1400 W and the water boiled within only 20 seconds when the can was heated through the base This is a great improvement to the heating times required when using a retort. Furthermore, heat of 1660 W or more may be applied through the sidewall of the can boiling 14s without damaging the lacquer (the coating used to protect the inside of can) and the decoration (printing and varnish coatings on the outside of the can) thus the time taken for processing may be further reduced.

It has also been found that when the can is heated from the side the thermal coupling with the can wall limits the heat input to around 1660 W so that even if a high field density is present underneath the can there is no more than 1660 W transferred into the can. This feature is especially beneficial in controlling the heat input very precisely based simply on the time that the can is passed over the induction heating coils rather than by the complex field pattern. Heat input is especially critical for sterilisation processes where a precise heat input is required in order to sterilise the product without degrading the food quality.

Stage D shows the can being rapidly cooled after processing by using water or a water and ice slush 5.

Figure 3:
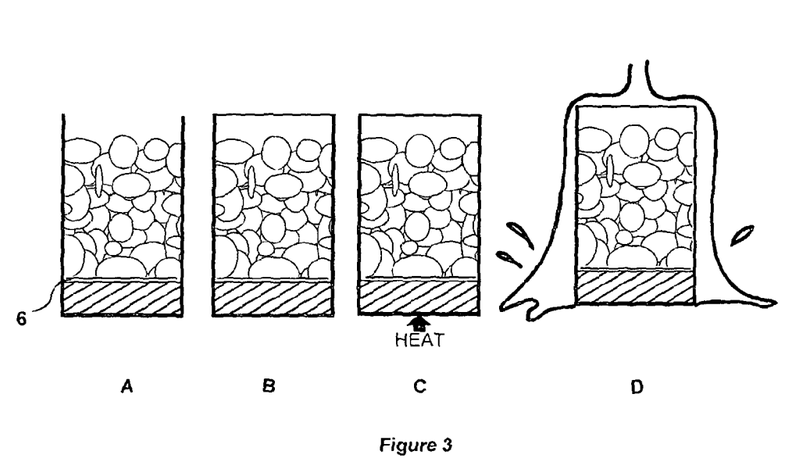
FIG. 3 shows alternative embodiments of metal cans at the four stages of the improved canning process of FIG. 1.
Figure 4:
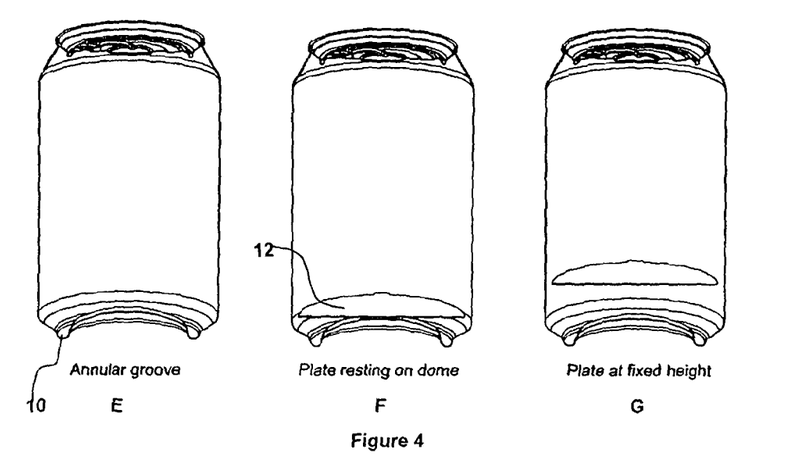
FIG. 4 shows cross-sections through three embodiments of metal cans that allow for water/product separation.

FIG. 3 shows cans provided with a separating platform 6 during the same improved canning process as FIG. 1. The separating platform 6 in the cans in FIG. 3 allows the particulate edible product to be kept separate from the water. This is particularly beneficial if the can is heated by induction in a static and vertical orientation, to stop some of the product being boiled in the water prior to it reaching the optimum temperature for processing. Separation of the particulate edible product from the water can be achieved in a variety of ways. FIG. 4 shows cross-sections through three cans that allow for water/product separation. Can E is provided with an annular groove 10 in the base of the can that can contain water. The groove is preferably sized such that particulate edible product cannot fit into the groove, thus keeping it separate from the water contained in the groove. Can F has a separating platform 12, or plate, that rests on a dome formed in the base of the can. Edible product particles will be supported by the platform, but water will be allowed to pass through into the cavity created between the base of the can and the platform. Can G has a similar separating platform 12 to Can F, but instead of it resting on the dome at the bottom of the can, it is supported at a fixed height part way up the length of the can. The separating platform may be provided with holes that allow water to pass through the platform, or the platform may have a slightly smaller diameter to the can, such that gaps are formed between the platform and the side wall which the water can pass through, but which the particulate edible product cannot.

Figure 5:
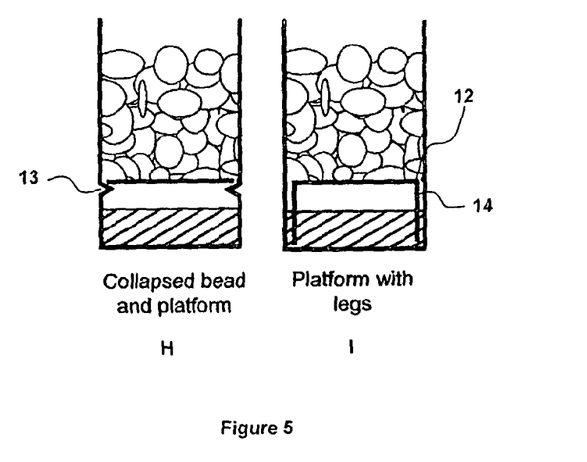
FIG. 5 shows two embodiments of metal cans supporting a separation platform.

The separating platform in Can G can be supported in a number of ways. Two examples are shown in Cans H and I of FIG. 5. Can H has an annular collapsed bead 13 formed part way up the side wall of the can, which provides a flange that extends radially part way into the can. The separating platform 12 then rests on top of this flange formed by the collapsed bead 13. Alternatively, as shown in Can I, the platform may be provided with legs 14 that support it at the desired height.

The platform could be designed in such a way that it can be used as a strainer by the consumer. In this instance, the can would be induction heated upside down, and the separating platform would therefore be located above the particulate product when the can is in an upright position. Then, once the can is opened, the platform can be used to drain water from the product prior to being removed itself.

Figure 6:
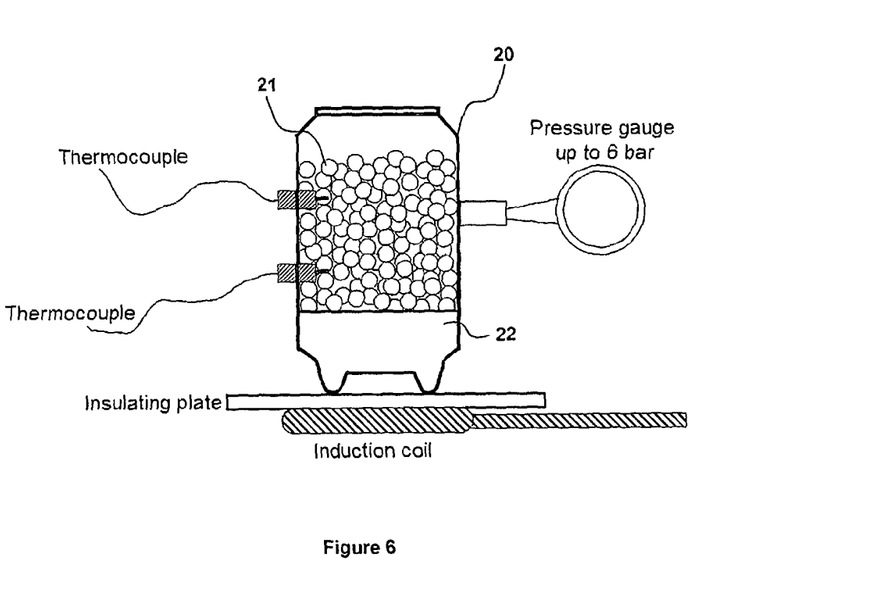
FIG. 6 shows an experimental set up used to research induction processing.

FIG. 6 shows an experimental set up used to research induction processing of peas 21 in a beverage-style can 20 using a small volume of water 22 as described above. The can is placed on an insulating plate that has an induction coil below. The can 20, for research purposes, is provided with a number of measuring devices in order to take measurements during the process. Two thermocouples are provided in the side wall of the can to measure the temperature at two different levels, and a pressure gauge is also provided. For the experimental set up shown in FIG. 6, 50 ml of water was added to the 330 ml can along with the peas, and a platform was provided to separate the peas from the water. For this experiment, the can was seamed at ambient pressure.

In the experiment, both temperature probes experienced a steep temperature increase between 60 to 100° C. The temperature increase was much faster than would be expected in a typical can that contains a large volume of water and that is being heated in a conventional retort. The lower probe heated much faster than the upper probe, but this was expected as the experimental set up did not allow for the can and its contents to be agitated due to wiring for the thermocouples and pressure gauge.

Figure 7:
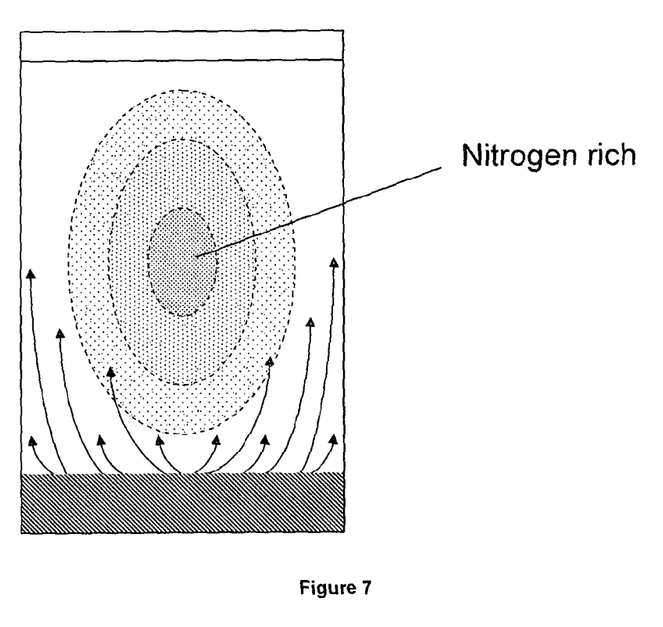
FIG. 7 shows a metal can experiencing nitrogen accumulation during processing.

Pre-pressurising the can at the time of sealing typically involves using a passive (i.e. inert) gas such as nitrogen. During heating, due to the production of water vapour at the bottom of the can and subsequent condensing on the side walls of the can, nitrogen will tend to accumulate adjacent to the particulate edible product (the peas), leaving the walls of the can nitrogen free. The nitrogen will collect around the peas and provide them with an insulating gaseous barrier as shown in FIG. 7. This shows that turning the can (rotating and up and over movements which will mix the mass of peas) will be advantageous. As previously explained, agitation of the can contents is important for a conventional can being heated by convection in a standard retort. However, for induction heating, the importance of agitation is not about getting mixing between the content touching the can wall and the inner content, but rather it is about allowing the hot water and vapour (the steam) to percolate to all the contents and to break down the passive gas blanket which will form around the coolest peas in the centre of the can.

Figure 8:
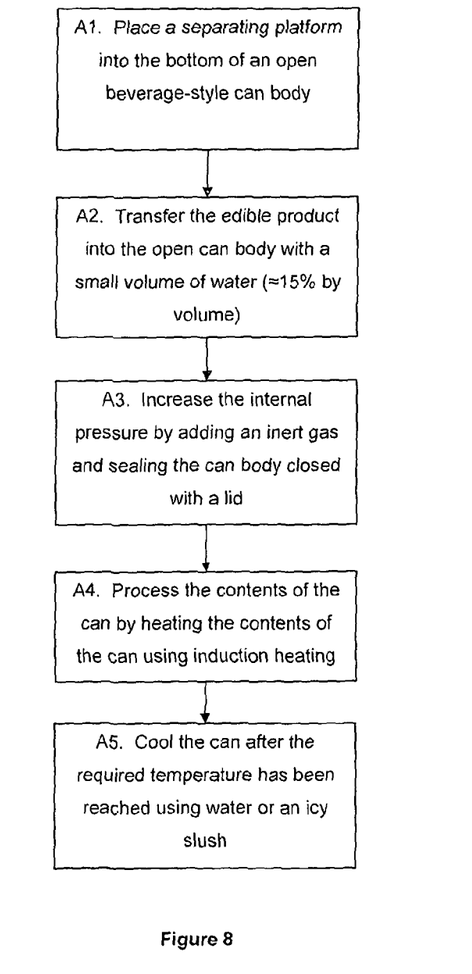
FIG. 8 is a flow diagram outlining the steps in an improved method of canning.

FIG. 8 is a flow diagram outlining the steps in an improved method of canning including an improved method of processing a canned particulate edible product. The steps of the method are:

A1. Place a separating platform into the bottom of an open beverage-style can body. The separating platform may be provided with legs to keep it at the required height from the bottom of the can, or the can side walls may be provided with an internal flange or other supporting means that can support the separating platform at the desired height.

A2. Transfer the particulate edible product into the open can body with a small volume of water (≈15% by volume). The particulate edible product will be supported by the separation platform, and the water will pass through the platform and enter the empty cavity formed between the bottom of the can and the separation platform. The volume of water that is added can be adjusted according to the requirements to process the particulate edible product, but it is advantageous that none of the particulate edible product is in contact with the water once the can is filled and in an upright orientation.

A3. Increase the internal pressure by adding an inert gas and sealing the can body closed with a lid. This can be carried out by closing the can and sealing the lid onto it within a pressurised nitrogen rich environment. During seaming, the can is provided with an internal pressure of between 0-30 psi (0-2.1 bars, 0-207 kPa), and preferably it is provided with a 20 psi internal pressure (about 1.4 bars, 138 kPa).

A4. Process the contents of the can by heating the contents of the can using induction heating. During heating the contents of the can are mixed to ensure the particulate edible product is processed evenly. Mixing can be carried out by vibrating, rotating and/or turning the can over during heating. With the increased internal pressure, the water boils at a higher temperature. For a can with an initial internal pressure of 20 psi, water will boil at a temperature of around 141° C. This creates a much higher temperature steam and means that the particulate edible product is processed very quickly, rather than being gradually heated. The internal pressure in the can will rise with the temperature, and at 141° C., the internal pressure will reach about 34 psi (2.3 bars, 234 kPa). The use of beverage-style cans is therefore preferred as they are able to withstand large increases in internal pressure much better than traditional food cans. Processing may be carried out using an induction conveyor that can handle processing and multiple cans A5. Cool the can after the required temperature has been reached using sprayed water or an icy slush. Once the particulate edible product has reached the desired temperature, and the contents of the can have been processed, the can is allowed to cool. The inert gas provided in the can may cause the can to cool more slowly due to thermal inertia. It is therefore preferred to maintain the mixing of the contents during the cooling stage. In addition, faster cooling can be encouraged by passing water over the can, or a water and ice slush mixture.

Figure 9:
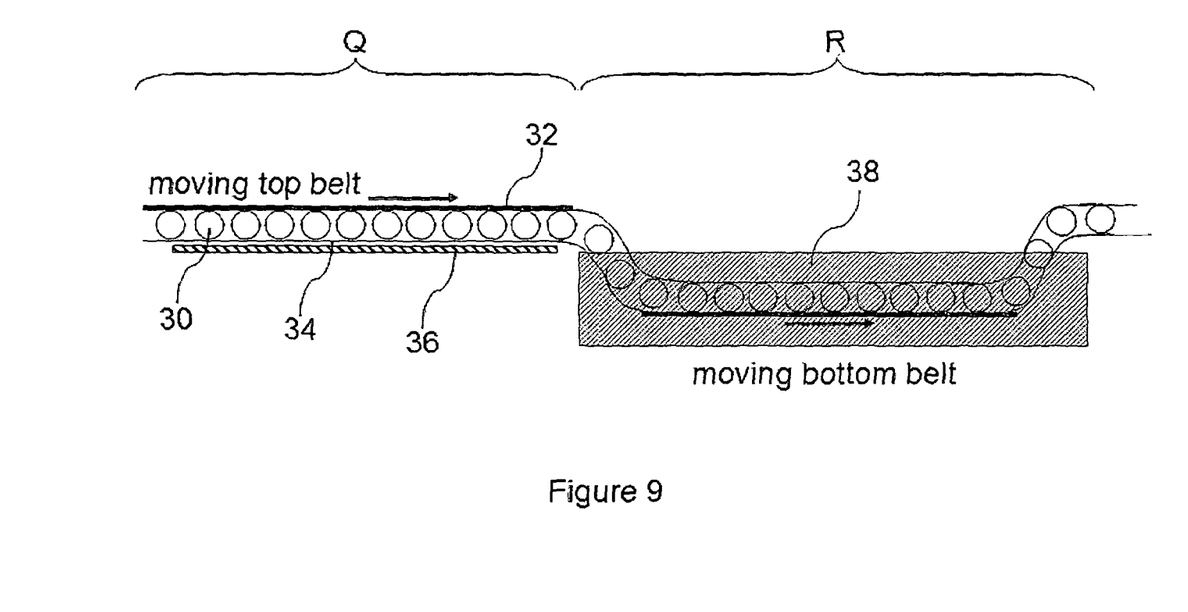
FIG. 9 shows a conveyor apparatus for processing and cooling canned particulate products.

Separation of the particulate product from the water is not important if the can and its contents are agitated during heating. An alternative to heating water in the base of the can is to heat the sidewall of the can whilst rolling as it travels along a conveyor, as shown in FIG. 9. This has the benefit that the area in contact with the product is greater thus reducing potential overheating and avoiding the need to have a water separator. In this case, the heating within the can is mainly by the hot water (and some steam) continually mixing with the particulates and transferring heat by conduction. The agitation of the contents is carried out by the rolling of the can. In a first section of the conveyor (area Q), cans 30 are rolled using a moving belt 32 positioned over the top of the cans. They are rolled across a platform 34, under which is provided the induction coil(s) 36 to heat the cans. Then in a second section of the conveyor (area R), the cans are submerged into a chiller bath 38 to cool them down. In the cooling section of the conveyor, the cans are rolled using a moving belt positioned underneath the cans 30.

The cans may also be made to rotate by contact by being driven along a stationary rail or rails such that there is no slippage between the can surface and the rails, with the induction coils being located under the rails.

Figure 10:
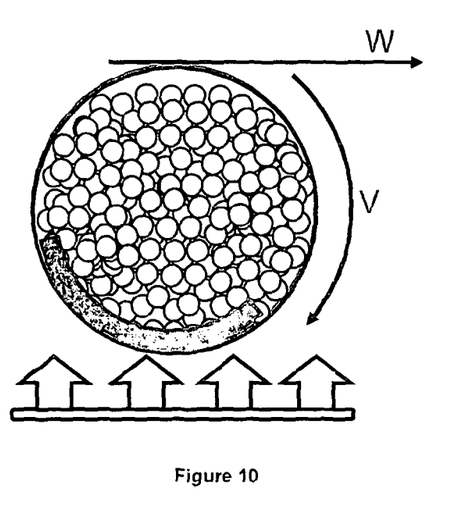
FIG. 10 shows the rotation motion of a can in a first section of the conveyor of FIG. 9.
Figure 11:
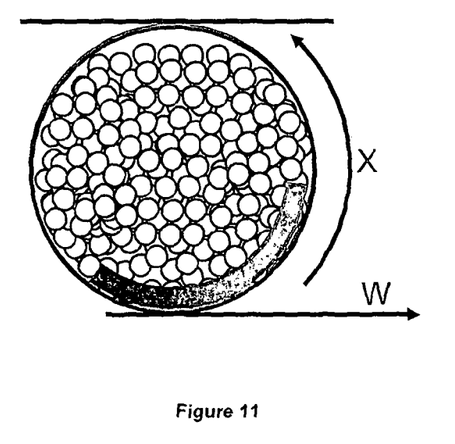
FIG. 11 shows the rotation motion of a can in a second section of the conveyor of FIG. 9.

FIG. 10 shows that having the top belt moving during the heating stage, the can is rotated (arrow V) in the direction of travel (arrow W). This ensures an even heating of the water inside the can, and therefore better processing of the particulate product. Whereas in FIG. 11, during the cooling stage, the can is rotated in the opposite direction (arrow X) to the direction of travel (W).

Figure 12:
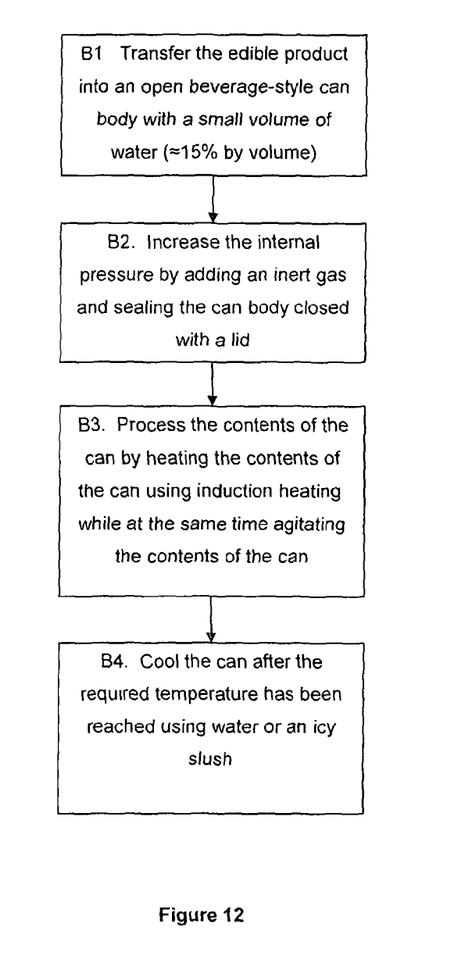
FIG. 12 is a flow diagram outlining the steps in a further improved method of canning.

Without the need for separation, a further flow diagram can be produced, as shown in FIG. 12, which outlines the steps in a further improved method of canning including an improved method of processing a canned particulate edible product. The steps of the method, which may, for example, be carried out in a canning plant along a canning and processing conveyor, are:

B1. Transfer the particulate edible product into an open beverage-style can body with a small volume of water (≈15% by volume). The volume of water that is added can be adjusted according to the requirements to process the particulate edible product.

B2. Increase the internal pressure by adding an inert gas and sealing the can body closed with a lid. This can be carried out by closing the can and sealing the lid onto it within a pressurised nitrogen rich environment, or more preferably by flushing the can with liquid nitrogen prior to fixing the lid to the can body. After it has been closed, the can should have an internal pressure of between 0-30 psi (0-2.1 bars, 0-207 kPa), and preferably it is provided with a 20 psi internal pressure (about 1.4 bars, 138 kPa).

B3. Process the contents of the can by heating the contents of the can using induction heating, while at the same time agitating the contents. Agitating the contents can be carried out by vibrating, rotating and/or turning the can over during heating. Preferably the can is rolled along a conveyor that has the induction coils underneath. The rolling motion acts to agitate the contents of the can. The internal pressure in the can will rise with the temperature, and at around 130° C. the internal pressure will reach about 70 psi. The use of beverage-style cans is therefore preferred as they are able to withstand large increases in internal pressure much better than traditional food cans.

B4. Cool the can after the required temperature has been reached using water or an icy slush, for example by spraying the water/slush over the can or by passing the cans through a chiller bath at a point along the conveyor. The inert gas provided in the can may cause the can to cool more slowly due to thermal inertia. It is therefore preferred to maintain the agitation of the contents during the cooling stage.

Some further benefits to the methods and apparatuses described herein are: the can body is lightweight, and that it is pressurised so has inherent abuse resistance; there is improved product quality as the product is cooked faster and less taste is lost to the water; reduced weight of product and packaging; reduced capital and operation costs as the cans are able to simply travel along a conveyor whilst being heated and cooled; and the end product has a new "image" that is unlike traditional food cans, which provides the consumer with the perception of a new and improved product.

It will be appreciated by the person of skill in the art that various modifications may be made to the above described embodiments without departing from the scope of the present invention.

The invention claimed is:

1. A method of canning and processing an edible product, the method comprising:
   filling a metal can body having one open end through said open end with the edible product and a volume of liquid, the volume of liquid comprising no more than 30% of the internal volume of the metal can body;
   fixing a lid to the metal can body to close the open end;
   increasing an internal pressure inside the closed can body, such that after increasing the internal pressure inside the closed can body the internal pressure inside the closed can body is greater than the ambient pressure and the internal temperature inside of the closed can body is at ambient temperature; and after the increasing step, heating the liquid in the can body to a boiling point of the liquid within 20 seconds using induction while an exterior of the can body is exposed to atmospheric pressure to thereby process the product, wherein the internal pressure inside the closed can body increases the boiling point of the liquid such that steam is produced from the liquid once a high temperature of at least 110 degrees C. is reached within the can.

2. The method according to claim 1, wherein the volume of liquid provided in the can is up to 20% of the overall volume of the can.

3. The method according to claim 1, wherein the volume of liquid provided in the can is substantially 15% of the overall volume of the can.

4. The method according to claim 1, wherein induction heating is applied to heat the liquid for no longer than 7 minutes.

5. The method according to claim 1, wherein the can wall thickness at the thinnest point on the sidewall of the metal can body is less than 0.1 mm.

6. The method according to claim 1, wherein, once closed, the metal can is able to withstand an internal pressure differential of at least 4 kPa.

7. The method according to claim 1, wherein the method further comprises agitating the contents of the metal can during at least the heating step by one or more of rolling, vibrating, rotating and turning over the metal can.

8. The method according to claim 1, wherein the method further comprises actively cooling the can and its contents after the heating step.

9. The method according claim 1, wherein the step of increasing the internal pressure inside the closed can body comprises pressurizing the closed can body with an inert gas before the fixing step.

10. The method according to claim 9, wherein the inert gas is Nitrogen.

11. The method according to claim 9, wherein the pressure differential between the inside of the can and the atmospheric pressure outside of the can before the heating step is between 5 and 30 psi (between 34.5 and 207 kPa).

12. The method according to claim 9, wherein the pressure differential between the inside of the can and the atmospheric pressure outside of the can before the heating step is substantially 20 psi (138 kPa).

13. The method according to claim 1, wherein the metal can is provided with a means for separating the edible product from the liquid inside the can.

14. The method according to claim 13, wherein the means for separating the edible product from the liquid is an annular groove formed in the base of the can into which the edible product does not fit.

15. The method according to claim 13, wherein the means for separating the edible product from the liquid is a separation platform supported part way up the length of the can body at a predetermined distance from the bottom of the can.

16. The method according to claim 13, wherein the steps of the method are carried out on a canning and processing conveyor.

17. A method according to claim 1, wherein said metal can body comprises steel.

18. A method according to claim 1, wherein said metal can body is configured such that, during the induction heating process, the temperature of the can body does not exceed 220 degrees Celsius regardless of field strength produced by an induction coil.

19. A method of processing an edible product contained in a metal can, the method comprising:
   filling the edible product in an open end of the metal can, the metal can having a base that defines a concave dome;
   fixing a lid to the metal can body to close the open end;
   increasing an internal pressure inside the metal can body, such that after increasing the internal pressure inside the closed can body the internal pressure inside the closed can body is greater than the ambient pressure and the internal temperature inside of the closed can body is at ambient temperature;
   moving the metal can along a conveyor; and
   energizing one or more induction coils located beneath the conveyor as the can passes over the one or more induction coils in order to heat the edible product, wherein during the step of energizing one or more induction coils,
      the internal pressure inside the metal can body increases a boiling point of the liquid such that steam is produced from the liquid once a high temperature of at least 110 degrees C. is reached within the can, and
      the boiling point of the liquid is reached within 20 seconds.

20. The method according to claim 19, wherein the edible product is a particulate edible product and the metal can is provided with a means for separating the particulate edible product from the liquid inside the can.

21. The method according to claim 20, wherein the means for separating the particulate edible product from the liquid is an annular groove formed in the base of the can into which the particulate edible product does not fit.

22. The method according to claim 20, wherein the means for separating the particulate edible product from the liquid is a separation platform supported part way up the length of the can body at a predetermined distance from the bottom of the can.

23. The method according to claim 19, further comprising the steps of filling the metal can body having one open end through said open end with the edible product and a volume of liquid, the volume of liquid comprising no more than 30% of the internal volume of the metal can body.

24. A method according to claim 18, wherein said metal can body is configured such that, during the induction heating process, the temperature of the can body does not exceed 180 degrees Celsius regardless of field strength produced by an induction coil.

25. The method of claim 1, wherein during the step of heating the liquid in the can body, the pressure differential between the inside of the can and the atmospheric pressure outside of the can reaches at least 70 psi.

26. The method of claim 1, wherein the internal pressure inside the closed can body increases the boiling point of the liquid to at least 140 degrees C.

27. The method of claim 1, wherein the liquid comprises water.

* * * * *